April 28, 1936.  E. BRYANT  2,039,056
COMBINED AWNING AND SHUTTER
Filed Jan. 30, 1935   4 Sheets-Sheet 4

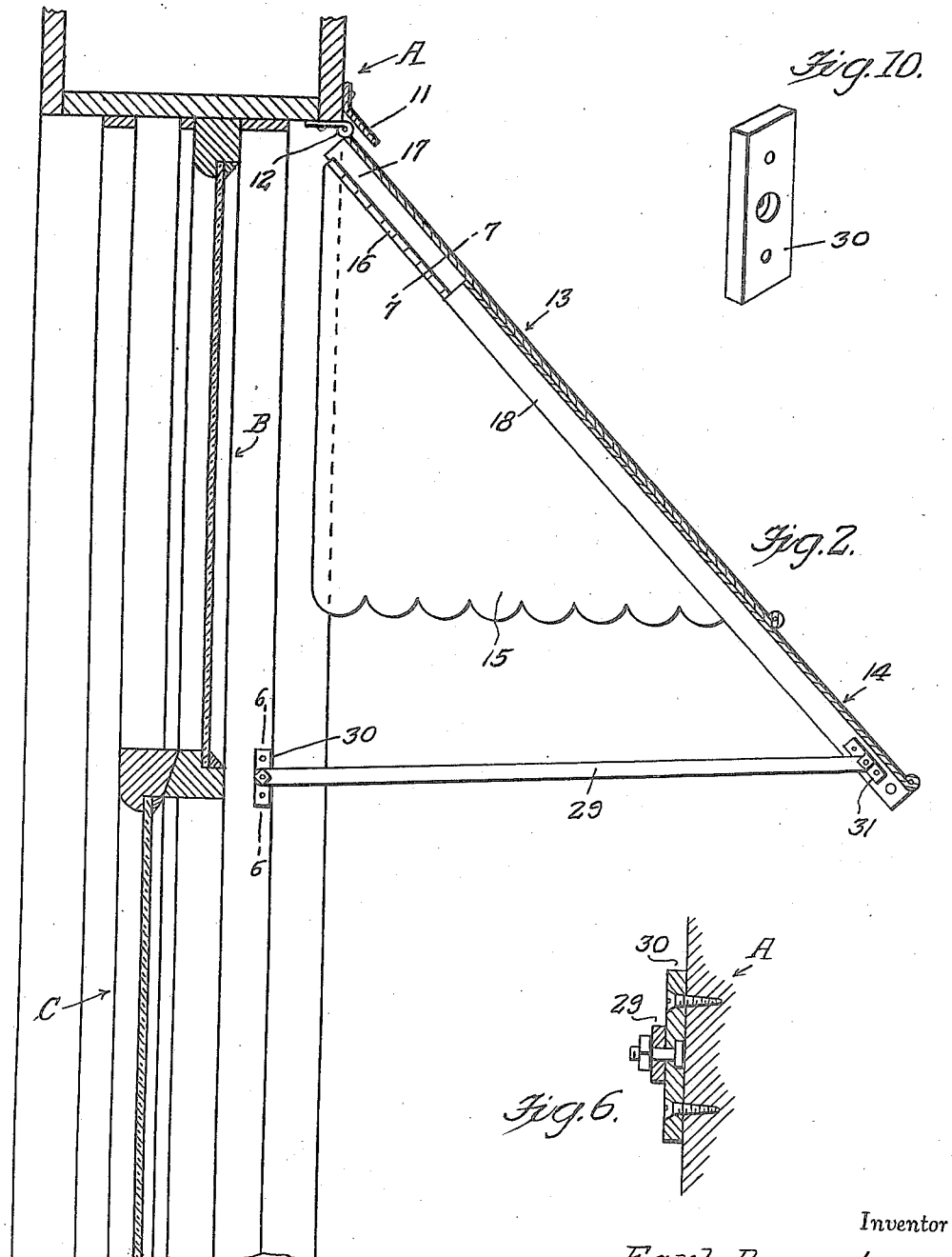

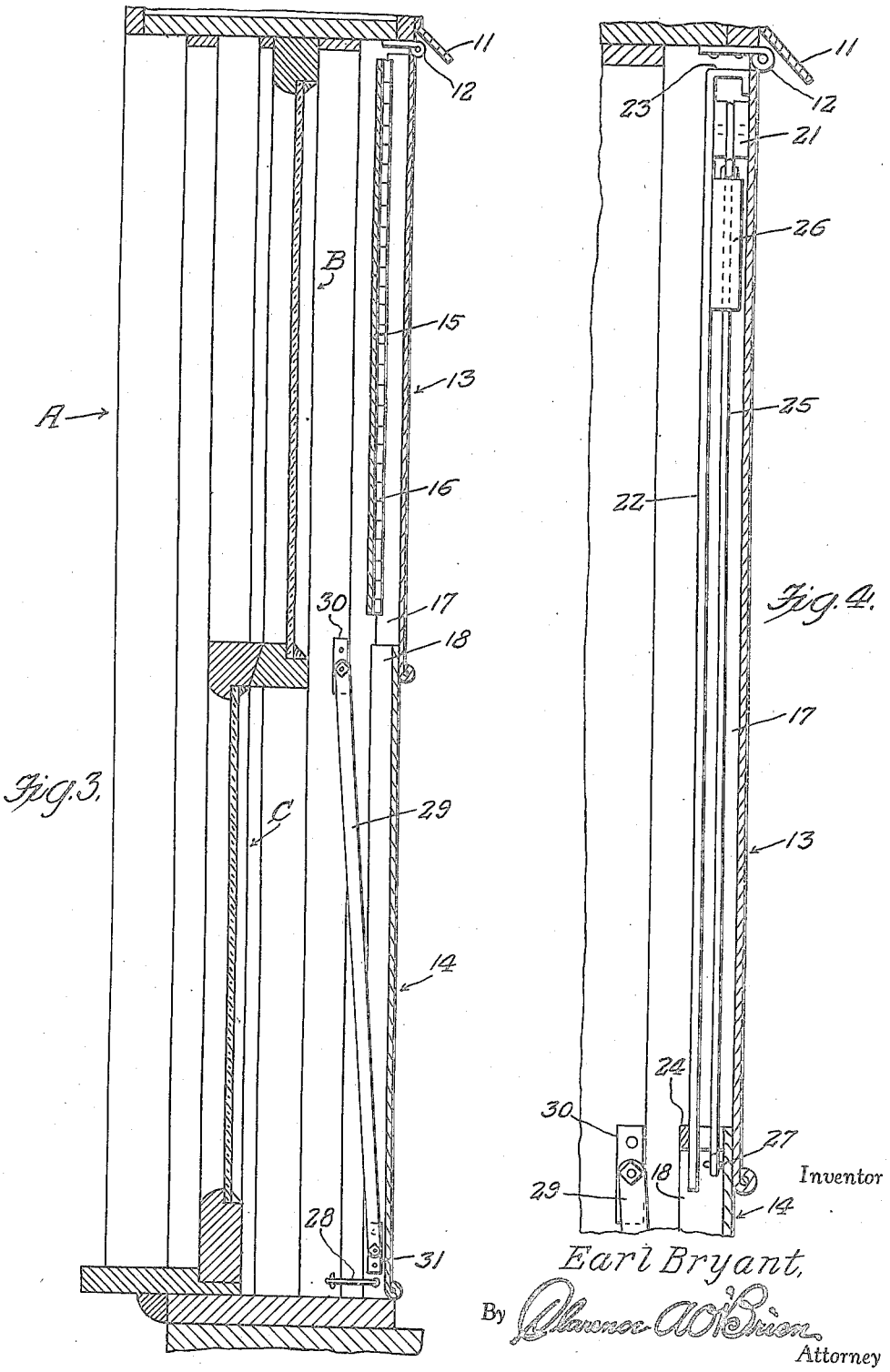

Inventor
*Earl Bryant,*
By
Attorney

Patented Apr. 28, 1936

2,039,056

UNITED STATES PATENT OFFICE 2,039,056

COMBINED AWNING AND SHUTTER

Earl Bryant, Galveston, Tex.

Application January 30, 1935, Serial No. 4,137

1 Claim. (Cl. 189—55)

This invention relates to a novel combination structure designed for use and association with slidable sash window constructions and similar closures for buildings and the like, and the invention relates in particular to a duplex structure generally referred to in the art and trade as a combination awning and shutter for windows.

Considering briefly that portion of the structure designated as the awning, it will be observed that this comprises a sheet metal assemblage characterized by a hingedly mounted awning forming plate equipped with hingedly attached foldable end flaps, together with suitable stay means designed to hold it in either outwardly extended position or inwardly collapsed shutter forming position.

Considering the shutter principle of the invention from its double acting capacity, it will be observed that this is made up of upper and lower telescopically connected plate sections susceptible of being collapsed into relatively short dimensions to form the awning proper or to be extended into projected position to serve as a full shutter or closure for the window.

One feature of the invention is predicated on the interconnected rib and channel feature serving to telescopically join the companion sections in awning and shutter forming relationship.

A second feature is predicated on the simple stay means which is susceptible of use in either one of its two definite positions, that is, in a horizontal awning supporting position or in a perpendicular shutter retention position.

More explicitly structural novelty is predicated on the incorporation in the structure of a sash weight and pulley arrangement serving as counter balancing means to facilitate sliding the lower section.

My primary aim, however, is to generally improve upon constructions of this general classification by providing one which is simple, economical, sturdy and dependable, susceptible of expeditious conversion from an awning to a shutter or vice versa, and which is otherwise well adapted to fulfill the requirements of an assemblage of this type.

Other features and advantages will become more readily apparent from the following description and drawings.

In the drawings:

Figure 2 is a slightly enlarged fragmentary sectional view of a vertical type showing the awning in the manner in which it is used.

Figure 3 is a view based on Figure 2 and showing the sections extending into shutter forming position and swung down to window closing position.

Figure 4 is a vertical sectional view taken approximately on the plane of the line 4—4 of Figure 1.

Figure 6 is a detail section on the line 6—6 of Figure 2.

Figure 10 is a detail perspective.

Figure 1:
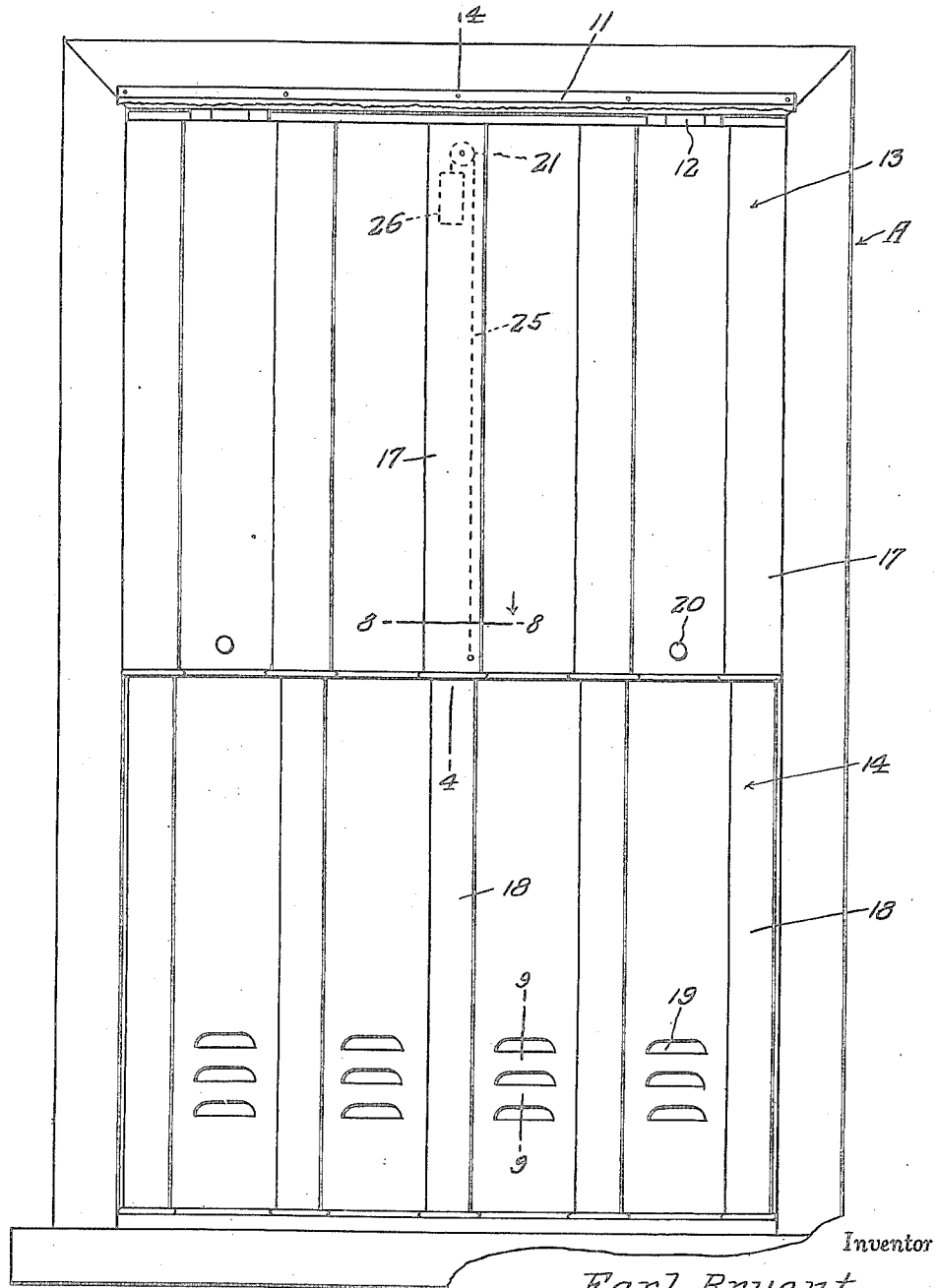
Figure 1 is an exterior elevational view showing the complemental or companion sections of the structure extended into shutter forming position, and swung down to window shielding position.

In the drawings, in Figure 2 for example, the window frame which is conventional is denoted by the letter A, and the sliding sashes are indicated at B and C, respectively. The numeral 11 merely designates an inclined guard flange or hood which serves as a weather shield for the underlying hinge 12. This hinge means 12 serves to connect the upper plate section 13 to the frame structure. The companion or complemental lower plate section is denoted at 14 and these are commensurate in proportion for proper coordination. Each plate is of general rectangular form and preferably constructed from light weight sheet metal of a weatherproof type. Along its longitudinal edges and adjacent the upper hinged end, the section 13 is provided with a pair of substantially triangular end flaps 15. These are of sheet metal and hingedly attached as at 16 and are foldable in the collapsed position as illustrated in Figure 3 when the structure is used as a window shutter. These flaps may be suitably ornamented to provide the requisite awning appearance.

Figure 8:
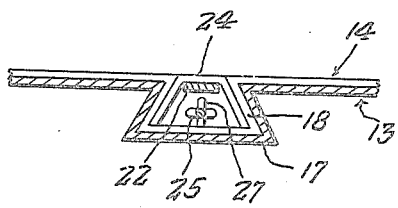
Figure 8 is a horizontal section on the line 8—8 of Figure 1.

At longitudinally spaced points, the section 13 is formed with outwardly pressed guide channels 17 which are of dove-tail cross sectional form as illustrated for example in Figure 8. These are intended to receive the correspondingly shaped ribs 18 formed on the lower section 14.

Figure 9:
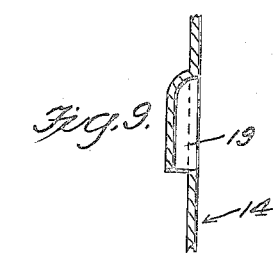
Figure 9 is a vertical section on the line 9—9 of Figure 1.

That is to say, the ribs slide telescopically in the channels and this serves to properly join the two sections 13 and 14 in slidable overlapping relationship. As shown in Figure 1, I provide a plurality of these cooperating ribs and channels to render the structure completely rigid throughout. For purposes of ventilation, the lower section is provided with the louvres 19 (see Figure 9) which provide for requisite ventilation, while at the same time maintaining the desired weatherproof facilities. The numerals 20 designate fasteners as shown in Figure 1, which may be provided on the upper section for cooperation with the lower section to facilitate holding the two sections in contracted or collapsed relationship. These fasteners may be of any suitable type and therefore are not detailed in the drawings.

Figure 5:
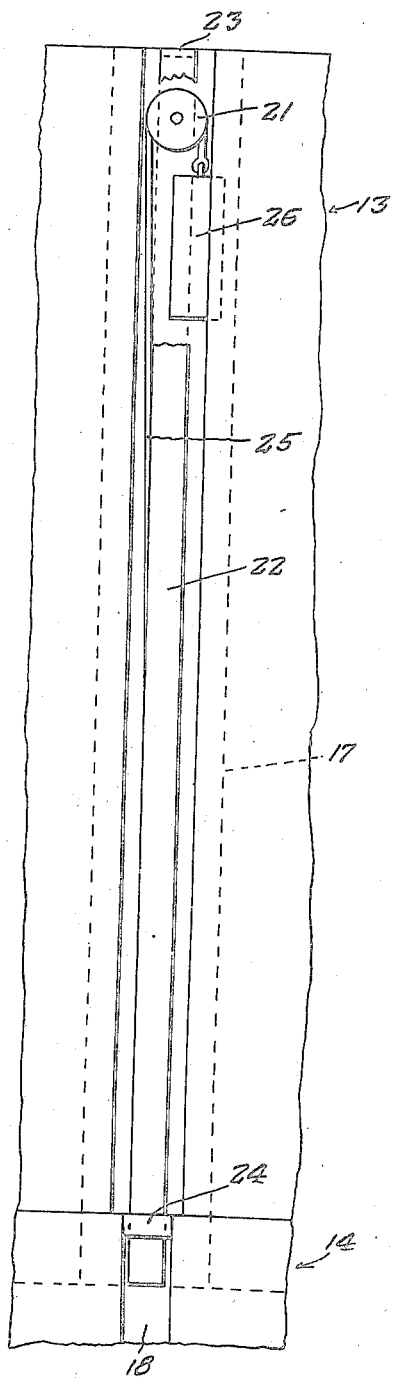
Figure 5 is a view observing Figure 4 in a direction from left to right, the parts being shown in elevation, and portions being broken away for clearness of illustration.
Figure 7:
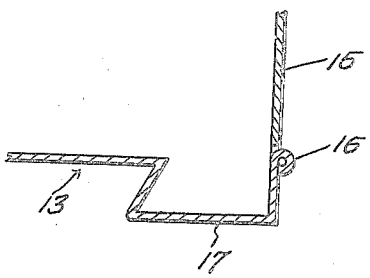
Figure 7 is a cross section, slightly enlarged, on the plane of the line 7—7 of Figures 1 and 2 respectively.

The principal means for holding the section 14 in its retracted position as illustrated in Figure 2 comprises a counter balancing arrangement. This comprises a pulley 21 which is mounted in the upper part of the central channel 17 of the upper section as shown in Figures 4 and 5. In this connection I call attention to a metal strap 22 whose upper end is bent laterally as indicated at 23 to serve as an adapter for the pulley. This strip has its lower end extending down through a substantially U-shaped clip 24 mounted in the extreme upper end of the rib on the aligned part of the lower section. The strip 22 is in a sense a guard for the pulley or cable 25 and this is of suitable flexible material and is provided at its upper end with a sash weight 26. The lower end is formed into an eye and anchored on a stud or pin 27 as shown in Figure 4. The stud is carried by the lower section and it is obvious that this joins the two sections operatively in a manner to provide the requisite automatically operating counter balancing feature. That is to say, by grasping the lower section and swinging it out from the position shown in Figure 3 and then pushing it up the weight and cable comes into play to facilitate the desired telescoping action. This therefore, provides the principal means for holding the two sections in retracted awning forming position as denoted in Figure 2. I might also mention a pivoted latch 28 which is provided as shown in Figure 3 to hold the lower section down in shutter forming position. In addition I call attention to the numeral 29 which constitutes a stay link pivoted on a block-like bracket 30 mounted in the window frame and also pivoted on a similar or complemental bracket 31 carried by the lower end of the lower section 14. This link serves as a requisite stay device to facilitate supporting the parts in awning forming relationship and it also serves to aid in bracing the structure when the parts are extended into shutter forming position as disclosed in Figure 3.

By emphasis I wish to stress the counter balancing means utilizing a simple sash cord and weight arrangement wherein said parts are consolidated with the strip 22 and clip 24, all of these features being confined in the cooperating channel and rib formation of the two slidable sections of the structure. Incidentally, the element 25 might be in the form of a lead wire which could be meltable at a high temperature to throw the weight out of play and to allow the lower section to drop down rapidly by gravity to utilize the structure as a sort of a fireproof closure for the window.

The subject matter of this invention has been developed after careful consideration involving the requisite foresight to provide a competitive structure in this line of endeavor susceptible of receiving unqualified endorsement of those skilled in the art to which the invention relates. In importance and practicability the invention transcends in my opinion, allegedly similar structures. It is characterized by appreciable refinements and improvements and is a novel adaptation in serving the double purpose of an awning on the one hand for open window use, and as an effective shutter on the other hand. In the capacity of a shutter it serves satisfactorily as a shield against the elements and is a novel storm closure. These and other features and advantages of the invention, collectively considered, meet the requirements to which the structure will be subjected in useful performance.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details coming within the field of invention claimed may be resorted to in actual practice, if desired.

Having thus described the invention, what is claimed as new is:

In a combined shutter and awning assembly, a pair of upper and lower plates, the upper plate being provided with a longitudinal guide channel and the lower plate with a rib slidable in said channel, an anchoring pin located in the upper end of the rib, a pulley located in the upper end of the guide channel, a cable trained over said pulley and provided with a sash weight on its free end, the opposite end of said cable being attached to said pin, and a clip of U-shaped form fastened in the upper end of the rib adjacent said pin, a guard strap having its lower end fastened in place by said clip, the upper end thereof being bent laterally to serve as an adapter and support for the pulley, said strap cooperating with the cable to serve as a guard and to prevent displacement thereof.

EARL BRYANT.